United States Patent
Wisst

[15] 3,661,062
[45] May 9, 1972

[54] TEST CIRCUIT FOR PHOTOGRAPHIC CAMERAS

[72] Inventor: Otto Wisst, Waiblingen, Germany
[73] Assignee: Eastman Kodak Company
[22] Filed: Mar. 11, 1971
[21] Appl. No.: 123,278

[30] Foreign Application Priority Data

Mar. 20, 1970  Germany .......................P 20 13 432.1

[52] U.S. Cl. ..........................95/10 CE, 95/53 EB, 356/227
[51] Int. Cl. ........................................G03b 7/08, G01j 1/44
[58] Field of Search ................95/10 C, 10 CE, 10 CT, 53 R, 95/53 E, 53 EB; 356/218, 225, 226, 227

[56] References Cited

UNITED STATES PATENTS

| | | | |
|---|---|---|---|
| 3,425,328 | 2/1969 | Ichij et al. | 95/10 CT |
| 3,448,671 | 6/1969 | Rentschlov et al. | 95/53 EB |
| 3,460,450 | 8/1969 | Mamoru Osihara | 95/10 CT |
| 3,581,643 | 6/1971 | Hirofumi Yoshimura | 95/10 CE |

FOREIGN PATENTS OR APPLICATIONS 1,522,305  8/1969  Germany ...........................95/10 CE

*Primary Examiner*—Joseph F. Peters, Jr.
*Attorney*—W. H. J. Kline and R. Lewis Gable

[57] ABSTRACT

In a camera having a light-integrating, timing circuit for determining shutter speed in accordance with the intensity of scene illumination, a circuit is provided for determining whether the scene illumination is below a predetermined value and for determining the condition of the power source to be inserted in the timing circuit. The test circuit includes an indicating means such as a lamp, a first switch for energizing the lamp, an element whose impedance is dependent upon incident scene illumination, and a second switch which serves to turn "on" the first switch when scene illumination incident upon the element falls below a predetermined value. The test circuit further includes a circuit element (or combination of circuit elements) responsive to the potential of the energizing source, for preventing the second switch from turning "on" the first switch when the potential of the energizing source is below a predetermined value.

6 Claims, 1 Drawing Figure

PATENTED MAY 9 1972
3,661,062
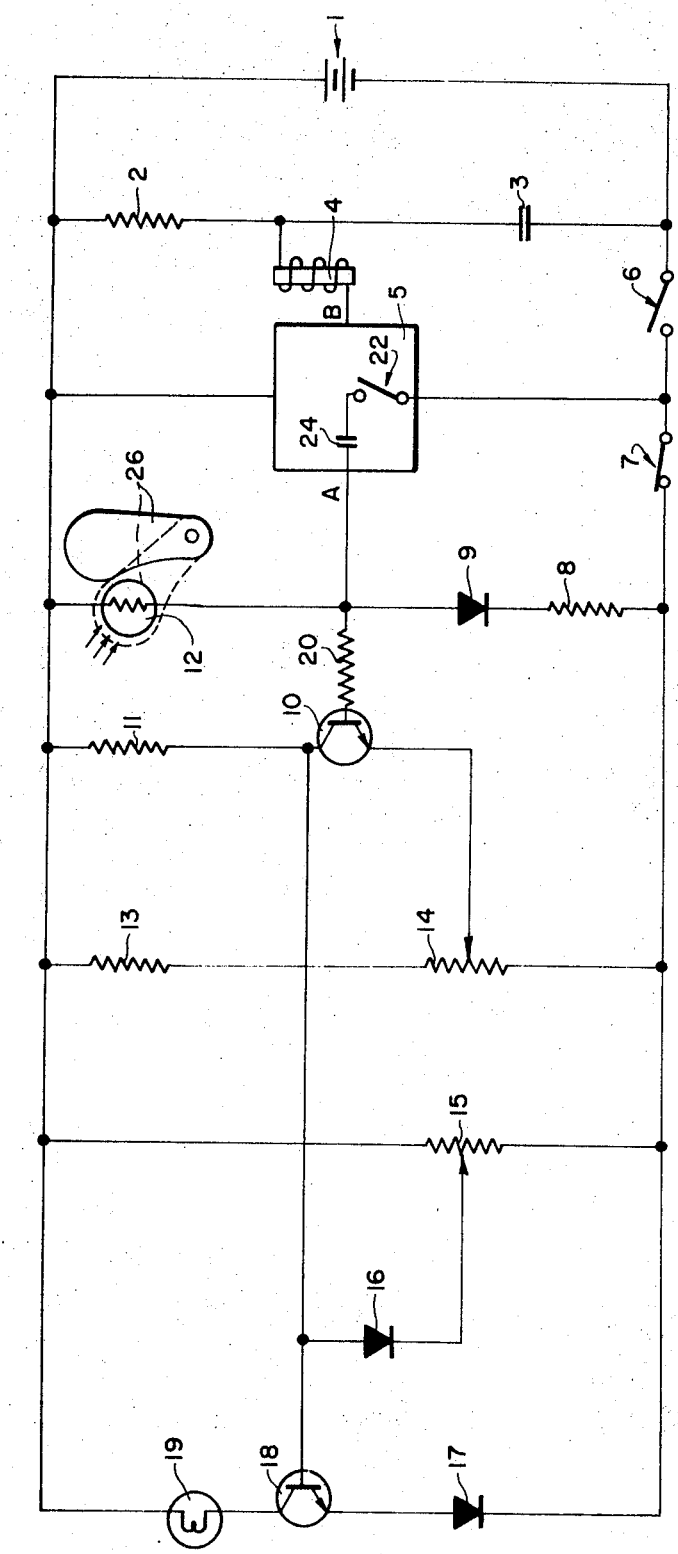
OTTO WISST
INVENTOR.
BY R. Lewis Gable
W. H. J. Kline
ATTORNEYS

TEST CIRCUIT FOR PHOTOGRAPHIC CAMERAS

CROSS REFERENCES TO RELATED APPLICATIONS

References are made to commonly assigned co-pending U.S. Pat. application, Ser. No. 124,095, filed Mar. 15, 1971 entitled "Shutter Control Apparatus For Photographic Cameras", filed in the names of Otto Wisst and Karl-Heinz Haberle; and to commonly assigned co-pending U.S. Pat. application, Ser. No. 127,475, filed Mar. 24, 1971 entitled "Shutter Control Apparatus For Photographic Cameras", filed in the names of Paul J. Ernesse and Robert L. Reynolds.

BACKGROUND OF THE INVENTION

1. Field of the Invention

This invention relates to shutter control apparatus for photographic cameras and more particularly to a test circuit associated therewith for determining whether there is sufficient illumination for film exposure and for determining the condition of the energization source incorporated into the shutter control apparatus.

2. Description of the Prior Art

Exposure control systems are well known which employ light-integrating, timing circuits including a photosensitive element such as a photoresistor or photocell for establishing the exposure interval as a function of incident scene illumination. Typically, such systems include devices for indicating whether the incident scene illumination is sufficient for film exposure. Further, such devices may include illustratively one or several lamps for indicating such condition as shown in West German Pat. Nos. 1,276,437; 1,287,923; 1,472,663; and East German Pat. No. 55,542.

Further, it is also known to provide such exposure control systems including an appropriate circuit for measuring and indicating the state of the energy source, e.g. a battery, for example as shown in West German Pat. Nos. 1,249,082 and 1,160,299; and East German Pat. No. 55,542.

However, such test circuits provide an indication of incident scene illumination which is dependent upon an energy or power source having an energy level (or potential) sufficient to turn "on" a switch and/or indicating means such as a lamp. However, after extended use, the energy source may be dissipated when the prospective user operates the test circuit and the potential source would not have sufficient potential to energize the indicating means under a low light condition. Thus, the indicating means may provide an erroneous signal because of a spent potential source.

SUMMARY OF THE INVENTION

It is an object of this invention to measure both the intensity of incident scene illumination and also to measure the level of the energy source incorporated in the testing circuit.

Another object of this invention is to provide an indication of incident scene illumination below a predetermined level and to enable the camera operator to check whether such indication was due to either scene illumination or to a failing energy source.

These objects are accomplished according to the teachings of this invention by a light-integrating, timing circuit for a photographic camera including a test circuit having means for providing a manifestation of low incident scene illumination, first switch means for energizing said manifestation means, an element whose impedance is a function of incident scene illumination, second switch means responsive to the impedance of the element for energizing said manifestation means to provide an indication of low scene illumination, and means responsive to the energy level of the circuit energy source for disabling said first switch means.

In an illustrative embodiment of this invention, the disabling means may comprise a potentiometer disposed in circuit with the potential source for providing a reference signal, and an uni-conducting means such as a diode for connecting the first switch means to the reference signal which is dependent upon the energy level of the potential source. Thus, when the energy source becomes dissipated, the reference level is sufficiently low so as to disable or prevent the first switch means from being turned on.

In an another illustrative embodiment of this invention, means may be provided for blocking the element from incident scene illumination to thereby turn "off" the second switch means when the circuit potential source is in an inoperative condition. If the circuit potential source is in an operative condition, the potential applied to the first switch means would be sufficient to turn "on" the first switch means to provide an indication from the manifestation means of low incident scene illumination.

BRIEF DESCRIPTION OF THE DRAWINGS

In the detailed description of the preferred embodiment of the invention presented below, reference is made to the accompanying drawing in which there is shown a light-indicating, timing circuit including test circuits in accordance with the teachings of this invention.

DESCRIPTION OF THE PREFERRED EMBODIMENT

Because photographic cameras are well known in the art, the present description will be directed in particular to elements forming part of, or cooperating more directly with, the present invention, camera elements not specifically shown or described therein being understood to be selectable from those known in the art.

More specifically, the timing circuit shown in the drawing may be incorporated in a photographic camera illustratively having a two-blade impact shutter of the type shown in the above-identified, co-pending application to Ernisse and Reynolds. The camera described therein includes a shutter mechanism having an opening blade movable from an aperture blocking position to an aperture unblocking position to thereby initiate the exposure interval and a closing blade releasably by the armature of an electromagnet, to move from an aperture unblocking position to an aperture blocking position to thereby terminate the exposure interval. Upon actuation of the camera release the opening blade is moved rapidly by a driving member, which is cocked during film transport, into its aperture unblocking position. A latch then holds the opening blade in its aperture unblocking position. Further, this photographic camera includes a light-integrating, timing circuit including an element whose impedance is dependent upon incident scene illumination and which serves upon initiation of the exposure interval to charge a timing capacitor up to a predetermined level at which the electromagnet is actuated. The closing blade is now released to move under spring tension its aperture blocking position and to unlatch the opening blade which returns to its initial, aperture blocking position. The opening blade, also serves to return the closing blade to its initial, aperture unblocking position.

With regard to the drawing, there is shown a light-integrating, timing circuit including a test circuit in accordance with the teachings of this invention. More specifically, there is shown a voltage or energy source 1 connected in series with a resistor 2 and a capacitor 3. A transducer or electromagnet 4 is connected between the common point of resistor 2 and capacitor 3, and the output terminal B of a threshold switching circuit 5, which serves to selectively energize the electromagnet 4 to thereby release the closing blade and to terminate the exposure interval. This switching circuit is not shown in detail since this type of circuit is well known in the art. One well known example of such a circuit is a Schmitt trigger which functions to actuate electromagnet 4 upon the application of a signal above a predetermined threshold value or potential. Though not a part of this particular invention, a timing capacitor 24 is connected to an energizing switch 22 within the switch circuit 5. The switch 22 is schematically representative of the switching mechanism shown in the above-identified, co-pending application to Wisst and Haberle. In a manner explained in this application, the switch 22 is closed in response to the movement of the opening blade from its aperture blocking position to its aperture unblocking position to thereby begin the timing operation of the integrating circuit including the capacitor 24 and a photoresponsive element 12, which may illustratively take the form of a photoresistor whose impedance is dependent upon incident scene illumination. When the capacitor 24 has charged to the threshold value, the switching circuit 5 operates to actuate the electromagnet 4.

With regard to the drawing, the potential source 1 is connected by a switch 6, which is closed in response to the initial movement of the camera release, to the remaining part of the circuit. The potential source 1 is connected in series with the photoresistor 12, a diode 9 and a resistor 8, when a switch 7 is closed. The switch 7 is closed when the camera is not in use and during the initial travel of the camera release member. In accordance with the first aspect of this invention, the photoresistor 12 is connected through a resistor 20 to a suitable switching means 10 such as a transistor, to form a limit value monitor or first test circuit for determining when the scene illumination incident on the photoresistor 12 is below a predetermined value insufficient to provide satisfactory film exposure. More particularly, the emitter of the transistor 10 is connected to the tap of a variable resistor or potentiometer 14. The collector of the transistor 10 is connected by a resistor 11 to one terminal of the potential source 1. Further, the variable resistor 14 is connected in series with a resistor 13 across the potential source 1, when the switches 6 and 7 are closed, to thereby set the emitter potential of the transistor 10. The output from the first test circuit is derived from the collector of the transistor 10 and is applied to a second switching means which may illustratively take the form of a transistor 18. As shown in the drawing, the transistor 18 controls the energization of a suitable indication means such as a lamp 19. The emitter of the transistor 18 is connected through a diode 17 to a terminal of the potential source 1, when the switches 6 and 7 are closed. Further, the collector of the transistor 18 is connected through the lamp 19 to the other terminal of the source 1.

A second test circuit or limit value monitor is provided for testing the condition of the source 1 and in particular, for determining whether the potential of the source 1 is above a predetermined value sufficient to energize or cause the transistor 18 to be rendered to its conductive or "on" state. More specifically, the second test circuit includes a variable resistor or potentiometer 15 connected across the source 1 when switches 6 and 7 are closed and providing at its tap a reference potential. As shown in the drawing, the tap is connected through a diode 16 to the base of transistor 18.

As will be explained, both the first and second test circuits affect the energization of the lamp 19 which, for example, may be disposed to be visible in the viewfinder of the camera.

In operation, the camera operator actuates the camera release, to thereby close switch 6 during the initial movement of the camera release, which release may be equipped with a pressure point. As a result, the remaining portion of the circuit shown in the drawing is energized. With the switch still closed, the photoresistor 12 responds to the brightness of the illumination derived from the object to be photographed; if the intensity of the illumination is high, the impedance and more specifically the resistance of the photoresistor 12 is relatively small so that the potential developed at the common point between the photoresistor 12 and the diode 9 exceeds the threshold voltage of the transistor 10 and therefore, the transistor 10 is rendered conductive or to its "on" state. As the transistor 10 is rendered conductive and its impedance decreases, the potential developed at the collector of the transistor 10 is reduced to a value less than the threshold voltage of the transistor 18. As a result, the transistor 18 remains unconductive and the lamp 19 is not energized. When the lamp is not lit, the operator is informed that there is sufficient scene illumination to properly expose the film. More specifically, the intensity of the scene illumination is sufficient to provide proper film exposure at an interval less than one-thirtieth of a second. Typically, at exposure intervals of less than one-thirtieth of a second, the camera may be hand held and with sufficient scene illumination, an additional source of illumination such as a photoflash unit is not needed. If on the other hand, the intensity of the scene illumination is below a predetermined value and the exposure time required for film exposure would be more than one-thirtieth of a second, the lamp 19 is energized to inform the operator of this condition. More specifically, if the scene illumination incident upon photoresistor 12 is low, the impedance of photoresistor 12 increases to thereby decrease the potential applied to the base of the transistor 10 below its threshold voltage. As a result, the transistor 10 is not turned "on" and its impedance remains relatively high. As a consequence, the potential disposed upon the collector of the transistor 10 is of a sufficiently high value (assuming the potential source 1 to be in an operative condition) to render the transistor 18 conductive, thereby energizing the lamp 19 and indicating that the scene illumination is too low.

The second test circuit is designed to measure the potential level or condition of the source 1 and to provide a positive indication to the camera operator of the unsatisfactory condition of the source 1. In a particular embodiment of this invention, the level at which the source is deemed to be unsatisfactory may be set at 2.4 volts. As shown in the drawing, a blocking member 26 may be pivotally mounted to move from a first position in which scene illumination may be directed onto the photoresistor 12 to a second position covering or substantially blocking the photoresistor 12 from scene illumination. It may be understood that member 26 may be eliminated and that the camera operator may simply cover the camera aperture through which illumination is directed onto the photoresistor 12 with a finger. When the photoresistor 12 is covered, its impedance or resistance tends to increase and the potential applied to the base of transistor 10 is increased to render transistor 10 nonconductive. As a result, the transistor 18 would be switched "on" to render the lamp 19 energized. However, if the potential level of the source 1 is below a predetermined value, the diode 16 and the variable resistor 15 serve to disable or to prevent the transistor 18 from being turned "on". As shown in the drawing, the variable resistor 15 is disposed across the source 1 when the switches 6 and 7 are closed, and the tap thereof may be moved to provide a reference potential less than the threshold potential of the transistor 18, when the potential of source 1 is below the predetermined value, e.g. 2.4 volts. Thus, when the potential applied to the base of the transistor 18 begins to rise in response to the increasing impedance of the photoresistor 12, the diode 16 will begin to forward conduct to thereby clamp amp the base of transistor 18 to the reference potential provided at the tap of variable resistor 15. If the potential level of the source 1 is lower than the predetermined value, the reference potential derived from variable resistance 15 will not be sufficient to turn "on" transistor 18. As a result, lamp 19 cannot be energized as would normally happen in a low scene illumination mode of operation, thereby indicating that the source 1 has become dissipated to the point where it would not operate satisfactorily in the circuit.

It may be understood that other mechanical devices other than that indicated in the drawing, such as flags or slides, as actuated from a point on the camera housing, may also be provided to block or shield the photoresistor 12.

When the camera release is further pressed, switch 7 is opened and switch 22 is closed in a manner similar to that described in a co-pending application of Wisst and Haberle to commence the integration process dependent upon the scene illumination incident upon the photoresistor 12. The capacitor 20 will continue to charge to that point at which the switching circuit 5 serves to energize the electromagnet 4, at which time the closing shutter blade is released to thereby terminate the exposure interval.

Thus, there has been shown a test circuit capable of a plurality of functions and which is particularly adapted to be constructed by presently known integrated circuit technology. Further, it is thus possible to design test circuits for measuring various characteristics as indicated by potential levels and for designing test circuits so that the level at which one circuit is actuated is less than the actuating level of another test circuit. As a result, one test circuit or limit value monitor may be subordinated to the operation of the other. Thus, nonoperation of the test circuit or limit value monitor which is to be activated at the lowest potential level, indicated that the primary characteristic which may be essential for the operation of the entire circuit or system is not functioning and that the remaining portions or test circuits of the overall system will not operate satisfactorily. More specifically, as described above with regard to the above invention, if the lamp 19 is not energizable when the photoresistor 12 is covered, there is an indication that the potential source 1 is deficient and that the other test function(s) of the circuit may not operate satisfactorily.

The invention has been described in detail with particular reference to a preferred embodiment thereof, but it will be understood that variations and modifications can be effected within the spirit and scope of the invention.

I claim:

1. In a camera adapted to expose film to scene illumination through an exposure aperture, exposure sensing apparatus for sensing scene illumination and for determining the condition of an energy source for said exposure sensing apparatus, said exposure sensing apparatus comprising:
    a. photosensitive means responsive to scene illumination for providing a signal indicative thereof;
    b. indicating means responsive to the signal for providing an indication that scene illumination is less than a predetermined value; and
    c. test means for measuring the condition of the energy source and for disabling said indicating means when the energy level of the source falls below a predetermined value.

2. In a camera adapted to expose film to scene illumination through an exposure aperture, exposure sensing apparatus for sensing scene illumination and for determining the condition of an energy source for said exposure sensing apparatus, said exposure sensing apparatus comprising:
    a. first test means responsive to scene illumination for providing a first signal indicating that scene illumination is below a predetermined level;
    b. second test means adapted to be coupled to the source for providing a second signal indicating that the energy level of the source is below a predetermined value;
    c. energizable means for providing a visual indication; and
    d. switch means operative in a first mode in response to the first signal for energizing said indicating means and in a second mode in response to the first and second signals for preventing the energization of said indicating means.

3. In a camera adapted to expose film to scene illumination through an exposure aperture, exposure sensing apparatus for sensing scene illumination and for determining the condition of an energy source for said exposure sensing apparatus, said exposure sensing apparatus comprising:
    a. energizable means for providing a visual indication;
    b. switch means having an input terminal and having a threshold level above which said switch means is disposed in an operative mode for energizing said indicating means and below which said switch is disposed in an operative mode;
    c. first test means responsive to scene illumination for applying a first signal indicating that scene illumination is below a predetermined level to said input terminal;
    d. second test means adapted to be coupled to the energy source for providing a reference signal indicative of the potential level of the energy source; the reference signal being less than the threshold level of said switch means when the potential level of the energy source is less than an operative value; and
    e. means for maintaining the potential of said input terminal at a level not greater than that of the reference signal.

4. In a camera having a light-integrating, timing circuit for determining the exposure interval in accordance with the intensity of scene illumination, apparatus for sensing scene illumination and for determining the condition of a potential source for the timing circuit, said apparatus comprising:
    a. photosensitive means responsive to scene illumination and having an impedance dependent upon the intensity of incident scene illumination;
    b. first switch means responsive to the impedance of said photosensitive means for providing a first signal indicative that the intensity of scene illumination is below a first value;
    c. energizable means for providing a visual indication;
    d. second switch means having an input terminal for receiving the first signal and having a threshold level above which said second switch means is disposed in an operative mode for energizing said indicating means and below which said second switch means is disposed in an inoperative mode;
    e. test means adapted to be coupled to the potential source for providing a reference signal indicative of the potential level of the potential source; the reference signal being less than the threshold level of said second switch means when the potential source is below an operative level sufficient to normally energize the timing circuit; and
    f. means for maintaining the potential of said input terminal at a level not greater than that of said reference signal so that when the potential of the potential source is not above its operative level, said indicating means may not be energized.

5. Apparatus as claimed in claim 4, wherein there is included blocking means disposable from a first position to facilitate scene illumination being directed onto said photosensitive means, to a second position blocking the scene illumination from said photosensitive means.

6. Apparatus as claimed in claim 4, wherein said maintaining means comprises a unidirectional conducting device connected to said input terminal and to receive the reference signal.

* * * * *